United States Patent
Dalakuras et al.

(10) Patent No.: US 6,606,547 B1
(45) Date of Patent: Aug. 12, 2003

(54) METHOD AND DEVICE FOR REGULATING A REGULATING CIRCUIT

(75) Inventors: Lambros Dalakuras, Birkenfeld (DE); Frank Schmidt, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/869,644

(22) PCT Filed: Oct. 19, 2000

(86) PCT No.: PCT/DE00/03673

§ 371 (c)(1),
(2), (4) Date: Aug. 9, 2001

(87) PCT Pub. No.: WO01/33305

PCT Pub. Date: May 10, 2001

(30) Foreign Application Priority Data

Nov. 2, 1999 (DE) .......................... 199 52 700

(51) Int. Cl.$^7$ ............................ G05D 1/00; G05D 3/12; G06F 17/00
(52) U.S. Cl. ...................... 701/49; 701/36; 296/65.05; 296/65.06; 296/65.11; 318/466; 180/170
(58) Field of Search ................ 701/49, 96, 36; 296/63, 65.06, 64, 65.11, 65.05; 49/360, 139; 318/466, 443, 282; 180/169, 170, 65.4

(56) References Cited

U.S. PATENT DOCUMENTS

| | | | | |
|---|---|---|---|---|
| 3,628,042 A | * | 12/1971 | Jacobus | 290/40 R |
| 3,736,880 A | * | 6/1973 | Ross | 104/282 |
| 5,229,941 A | | 7/1993 | Hattori | 701/26 |
| 5,594,645 A | * | 1/1997 | Nishimura et al. | 180/169 |
| 6,157,154 A | * | 12/2000 | Amagasa | 318/41 |
| 6,208,102 B1 | * | 3/2001 | Kikuchi et al. | 318/282 |
| 6,226,925 B1 | * | 5/2001 | Shimura et al. | 49/139 |
| 6,243,635 B1 | * | 6/2001 | Swan et al. | 296/63 |

FOREIGN PATENT DOCUMENTS

| | | |
|---|---|---|
| CH | 685 362 A | 6/1995 |
| EP | 0 469 943 A | 2/1992 |
| EP | 0 583 773 A | 2/1994 |

* cited by examiner

Primary Examiner—Thomas G. Black
Assistant Examiner—Ronnie Mancho
(74) Attorney, Agent, or Firm—Michael J. Striker

(57) ABSTRACT

For a closed-loop feedback control of a controlled system having a predetermined set course and a control trajectory for use in controlled systems in motor vehicles, an output trajectory of the controlled system is measured for the entire control time in which the control trajectory is applied to the controlled system, an error of the controlled system is detected as a function of predetermined set course and the output trajectory, and a new control trajectory is calculated for each instant of a later control process as a function of the error and the control trajectory.

14 Claims, 1 Drawing Sheet

METHOD AND DEVICE FOR REGULATING A REGULATING CIRCUIT

Figure 1:
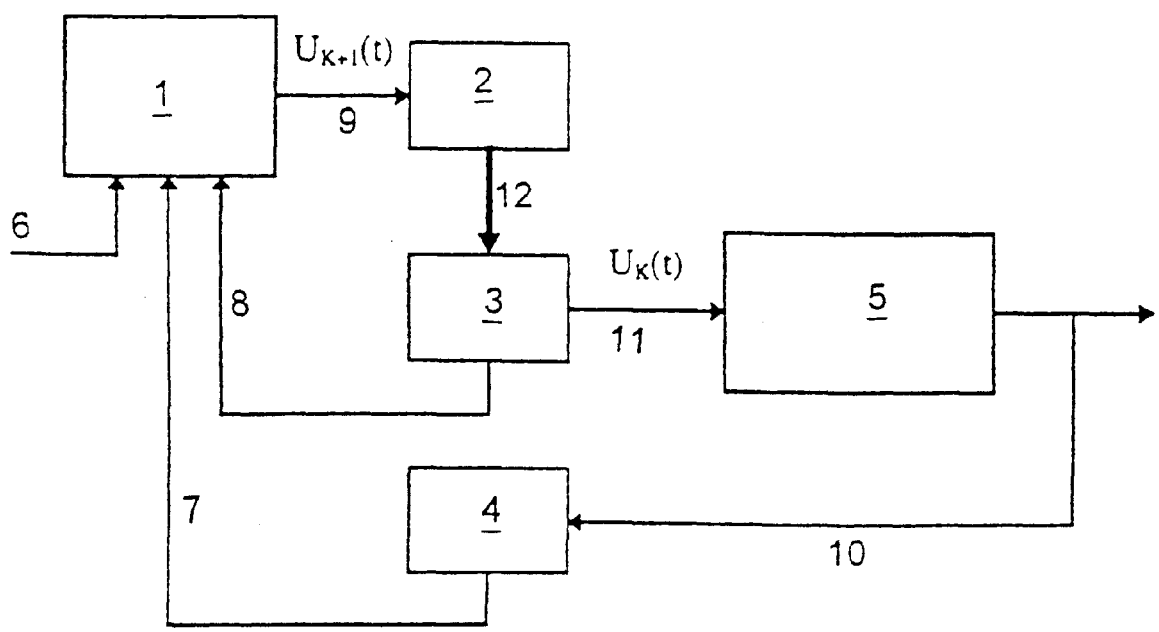

The invention relates to a method for the closed-loop feedback control of a controlled system having a predetermined set course and a control device for processes having a predetermined set course.

Methods for the closed-loop feedback control of motor drives are sufficiently known. Such controlled systems are used sufficiently in motor vehicles in particular, as in electrically actuated window lifters, seat controls, sliding doors, and/or speed control of wiper systems, for example. In a particular class of these control processes, the set course or a set trajectory of the controlled system is preset. The set course is to be followed repeatedly using the control process or the control device. The individual control processes can hereby be separated by longer time intervals. Such control processes having a predetermined set course are used widely in motor vehicles in particular. In electrically actuated window lifters, seat controls or sliding doors, and in the speed control of a wiper system, for instance.

A multitude of closed-loop feedback controls are made known in the related art. For example P, PI, PID controllers (proportional, proportional+integral, proportional+integral+differential), status controllers, adapter controllers are used for correction purposes along preset set courses. A change in the controlled system (actuator) presents particular difficulties for a control process. The quality of the control process is greatly diminished to a certain extent by changes, such as wear or ageing or parameter fluctuations caused by any other means. More complex control methods (adaption), which can take such changes into consideration, are very limited due to the high requirement on available computer power. Adapter methods often require an overproportionally high cost and material expenditure when used with simple and the simplest control processes in particular.

In light of this related art, the invention is based on the problem of providing a method and a control device that allow simple and reliable closed-loop feedback control of recurrent processes and can thereby take changes and varying influences of the controlled system into consideration.

The problem is solved according to-the invention by a method for the closed-loop feedback control of a controlled system having a predetermined set course and a control trajectory, whereby an output trajectory of the controlled system is measured for the entire closed-loop feedback control time in which the control trajectory is applied to the controlled system, an error of the controlled system is determined as a function of the set course and the output trajectory, and, finally, a new control trajectory is calculated for each instant of a later control process as a function of the error and the control trajectory. This method is based on the approach that a predetermined set course and a first predetermined control trajectory are present.

By comparing the actual output trajectory of the controlled system with the set course, the method according to the invention determines a new control trajectory that draws the output trajectory near to the set course. In this method, the set course and the control trajectory can have values that change over time, as well as constant values. Moreover, transient processes of the controlled system can also be taken into account in the control trajectory.

According to the invention, the output trajectory of the controlled system is measured for the entire closed-loop feedback control time in which the control trajectory is applied to the controlled system. The output trajectory and the set course serve to determine the error. The error is generally a measure of the deviation between the actual and set course of the controlled system. Time shifts/delays and other time-related phenomena of the controlled system can be taken into consideration in the determination of the error. According to the present invention, the new control trajectory is determined individually for every instant of a later control process. A new value of the control trajectory is calculated for a certain instant as a function of the error and the control trajectory, whereby the calculation is based on that error that was determined during application of the control trajectory with the aid of the measured actual values. An advantage of this method is that the great complexity of an adaptive method is avoided. The new control trajectory can be calculated at every instant in a simple manner, whereby no complex analyses, such as wavelet or Fourier transformations, are necessary.

In an embodiment of the method that further reduces the computing effort, the later control process, for which the new control trajectory is calculated, follows the control process in which the error was determined. In other words, the new control trajectory is always calculated for the subsequent control process. As a result, costly assignments between different control processes are avoided. With regard for this process step, it is given that the same set point course is preset again for the subsequent control process.

The computing effort is reduced particularly markedly in an advantageous further development of the method in which the value of the new control trajectory is determined in an instant of the subsequent control process from the values of the closed-loop control error and the control trajectory at an instant of the preceding control process, whereby the same length of time since a beginning instant in which the control trajectory was applied to the controlled system has transpired in the instants of each of the two control processes. Accordingly, the new control trajectory at an instant t is determined from the original control trajectory and the error in an instant $t^1$ from the preceding control interval. This relationship can be illustrated using the following formula:

$$u_{k+m}(t) = \phi_u(u_k(t^1)) \oplus \phi_e(e_k(t^1)),$$

whereby $t - T_{k+m} = t' - T_k$     Formula 1:

In this case, $T_k$ and $T_{k+m}$ represent the start of the $k^{th}$ or the $(k+m)^{th}$ control process, $u_k(\cdot)$ represents the control trajectory of the $k^{th}$ process, $e_k(\cdot)$ represents the error in the $k^{th}$ control process, and $u_{k+m}(\cdot)$ represents the control trajectory for the (k+m)th control process.

In the advantageous further development of the method, $\phi_{u,e}$ are symbols that assign a new value to a value of the control trajectory and/or the error. It proves extremely advantageous for the arithmetical implementation of this process that $\phi$ can be a function. In contrast, $\phi$ is often used as a functional, i.e., as a symbol of a function on a new function, in adaptive methods and/or other closed-loop feedback controls having a preset set course. Such a functional control relationship places high requirements on the control process and its implementation. As mentioned previously, the control relationship above can be simplified further using m=1.

The evaluation of the function values $\phi_{u,e}$ can take place using a suitable circuit or a microprocessor. The combination of the function values $\oplus$ can thereby take place using a suitable selected circuit as well.

In a further simplification of the method, which also reduces the computing effort again and increases the robustness of the calculation, the value of the new control trajectories ($u_{k+1}$) are determined from the sum of a first and a second value, whereby the first value is only a function of the value of the control trajectory ($\phi_u$), and the second value is only a function of the value of the error ($\phi_e$) The use of addition—element-wise addition in the case of multicomponent control trajectories—leads to a simple implementation of the control relationship with an adder. Moreover, addition has the advantage that detection errors in the determination of the error do not strengthen e, and the method can therefore be designed to be robust.

In the method according to the invention, it proves advantageous to calculate the value of the new control trajectory from the sum of the value of the old control trajectory and the error multiplied by a real factor K. In other words, the function $\phi_u$ is therefore selected as an identity symbol, and the function $\phi_e$ is selected as multiplication by a factor K. If multicomponent control trajectories and/or multicomponent errors are considered, element-wise multiplication and element-wise addition take place. In the case of a multicomponent error, a multicomponent real factor K can also be provided, which is multiplied element-wise by the error e.

It has proven appropriate to select the value of the factor $K \geq 0$. With a multicomponent factor K, each component is selected greater than zero ($\geq 0$). In a summary of the further developments of the method according to the invention described above, the following control relationship results:

$$u_{k+1}(t) = u_k(t) + K\, e_k(t'),$$

whereby $t - T_{k+1} = t' - T_k$ and $K \geq 0$     Formula 2:

Implementation of such a control relationship is extremely simple, especially since the amplification factor K can be carried out using a simple amplification circuit, and the addition can be carried out using a traditionally known adder.

In a further development of the method, the new control trajectory is calculated after completion of the control process in which the error was determined. This makes it possible to calculate the new control trajectory without a real-time requirement. Since sufficient computing time can be made available between two control processes for the computing process, the method described is an iteratively learning closed-loop feedback control in which no adaptation takes place during the control process.

In an appropriate further development, a predetermined set course can be selected from various predetermined set courses. It must then be taken into consideration that the selected set course must be included in the determination of the new control trajectory. To ensure clarity, the dependence on the set course selected—which is represented by the error e—is not reflected in the formulas above.

It proves to be particularly advantageous to store the set course, control trajectory, and error as sampled time series and to make them available to the method. The sampling rate in this case depends on the process to be controlled and the controlled system. In the method according to the invention, time characteristics can also be processed as functions, of course, either as an explicit time function or an implicit time function that is given as a solution to a differential equation, for example.

It proves appropriate to sample the time series at equal intervals.

According to the invention, the object is also solved using a control device for processes having a predetermined set course, whereby the control device comprises at least one storage means and a controller on which the set point course, a control trajectory, and an output trajectory of a controlled system belonging to the control trajectory are contained as input signals, which calculates a new control trajectory and stores it in the storage means, whereby the output trajectory and the control trajectory are also stored in the storage means. In the control device according to the invention, the controller determines a new set point course for the subsequent control process.

The signal values of the set course, the control trajectory, and the output trajectory are contained on the controller. The output trajectory is measured as the actual course of the controlled system while the control signal is applied. The control trajectory newly calculated in this manner is stored in the storage means, from which it is applied to the controlled system in a subsequent control process. The last control trajectory applied to the controlled system and the output values measured by the controlled system are also stored in the storage means.

In an embodiment of the control device according to the invention that simplifies the design of the controller, the values of the set point course, the output trajectory, and the control trajectory from an instant of the preceding control process are contained on the controller. As explained above, this reduces the calculation of a new control trajectory to the simple combination of values. Complex combinations that take the course of the trajectory into consideration or require transformations of the time format, are avoided with this controller. This reduces the hardware complexity of the controller.

The control device appropriately comprises three storage means. A modular design of the storage components is achieved as a result, so that the control device can be installed easily and manufactured with minimal material costs. According to the invention, the controller of the control device calculates the control trajectory according to one of the methods described previously.

A particularly advantageous embodiment of the invention will be illustrated and explained with reference to the sole figure.

The control device comprises a controller 1 and three storage means 2, 3, 4. Controller 1 and storage means 2 are connected by way of a line 9 in such a manner that the controller 1 can store a control trajectory in the storage means 2. The storage means 3 is connected with the controller 1 by way of a line 8 so that control values can be stored on the controller 1. The storage means 4 is connected with the controller 1 by way of a line 7 in such a manner that its storage contents are delivered to the controller 1. The control trajectory from the storage means 3 is stored on a controlled system 5 by way of a line 11. The actual value of the controlled system 5 is measured and written in the storage means 4 by way of a line 10. From there it is fed to the controller 1 by way of the line 7.

If the controller 1 has calculated a new control trajectory $u_{k+1}(t)$ and stored it in the storage means 2, the control trajectory is then copied from the storage means 2 into the storage means 3 by way of a line 12. In the subsequent $(k+1)^{th}$ control process, the control trajectory from storage means 3 is applied to the controlled system 5.

The predetermined set point is delivered externally from a further storage means (not shown) to the controller 1 by way of a line 6. Sensor information, such as signals from humidity sensors used with a windshield wiper control, can be taken into consideration as well in the predetermined set point.

The closed-loop feedback control takes place in that the actual values of the quantity to be controlled are measured during the control process using a digital computer (not shown), for example. Continuous quantities are sampled for this purpose. The time series sampled in this manner is stored in storage means 4. The control variable or control quantity applied to the process is stored in storage means 3. The set quantity is applied to the controller 1 by way of the line 6 in closed form or as a sampled time series so that the controller 1 can determine a control trajectory.

The process typically runs in fixed time intervals 0 through T. The sampling can take place at equal or different intervals and is usually not varied from control process to control process.

If a control process is completed, the measured courses from the storage means are used to calculate the entire set trajectory and/or control trajectory for the next process according to the control principle. Individual values of the trajectory and the error course can hereby by contained on the controller 1 by way of the inputs 6, 7, 8. This trajectory is stored in storage means 2.

The control variables are copied from storage means 2 to storage means 3. If the next process is started, the corresponding control variables are read from the storage means 3 and applied to the process of the controlled system 5. In terms of measured signal processing, it is particularly advantageous that signals are not processed during the process. Consequently, non-causal operations, such as non-causal digital filters, can be used. In addition, a smoothing of the measured curves can be achieved without delaying the control process.

What is claimed is:

1. Method for a closed-loop feedback control of a controlled system having a predetermined set course and a control trajectory for use in controlled systems in motor vehicles, whereby an output trajectory of the controlled system is measured for an entire control time in which the control trajectory is applied to the controlled system, an error of the controlled system is detected as a function of the predetermined set course and the output trajectory, and a new control trajectory is calculated for each instant of a later control process as a function of the error and the control trajectory.

2. Method according to claim 1, characterized in that the later control process for which the new control trajectory is calculated follows a control process in which the error was determined.

3. Method according to claim 2, characterized in that the value of the new control trajectory is determined in an instant of a subsequent control process from the values of the error and the control trajectory at an instant in the preceding control process, whereby the same virtual time has transpired since a beginning instant in which the control trajectory was applied to the controlled system in the instants of each of the two control processes.

4. Method according to claim 3, characterized in that the value of the new control trajectory is determined from the sum of a first and a second value, whereby the first value is a function of the value of the control trajectory, and the second value is a function of the value of the error.

5. Method according to claim 4, characterized in that the value of the new control trajectory is calculated from the sum of the value of an old control trajectory and the error multiplied by a real factor (k).

6. Method according to claim 5, characterized in that the value of the factor (k) is greater than 0.

7. Method according to claim 1, characterized in that the new control trajectory is calculated after completion of the control process in which the error was determined.

8. Method according to one of the claim 1, characterized in that the predetermined set course is selected from various possible set courses.

9. Method according to one of the claim 1, characterized in that the set course, the control trajectory, and the error are stored as sampled time series.

10. Method according to claim 9, characterized in that the time series are sampled at the same intervals.

11. Control device according to claim 10, characterized in that the controller calculates the new control trajectory using a method for a closed-loop feedback control of a controlled system having a predetermined set course and a control trajectory for use in controlled systems in motor vehicles, whereby an output trajectory of the controlled system is measured for the entire control time in which the control trajectory is applied to the controlled system, an error of the controlled system is detected as a function of predetermined set course and the output trajectory, and a new control trajectory is calculated for each instant of a later control process as a function of the error and the control trajectory.

12. Control device for processes having a predetermined set course, comprising at least one storage means, and a controller to which a set course is submitted via a line, an output trajectory is submitted via an actual value input, and a control trajectory is submitted via a control signal input, wherein the output trajectory is stored in a first storage means while the control trajectory is stored in a second storage means.

13. Control device according to claim 12, characterized in that values of the set course, the output trajectory, and the control trajectory from one instant of a past control process are contained on the controller at the same time.

14. Control device according to claim 12, characterized in that three storage means are provided.

* * * * *